(12) United States Patent
Giles et al.

(10) Patent No.: US 10,185,329 B2
(45) Date of Patent: Jan. 22, 2019

(54) METHODS AND SYSTEMS FOR VEHICLE-TO-VEHICLE COMMUNICATION

(71) Applicant: GM GLOBAL TECHNOLOGY OPERATIONS LLC, Detroit, MI (US)

(72) Inventors: Peter J. Giles, Ypsilanti, MI (US); Upali P. Mudalige, Oakland Township, MI (US); Shuqing Zeng, Sterling Heights, MI (US); Michael A. Losh, Rochester Hills, MI (US); Grant L. Meade, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 19 days.

(21) Appl. No.: 15/332,053

(22) Filed: Oct. 24, 2016

(65) Prior Publication Data

US 2018/0113476 A1    Apr. 26, 2018

(51) Int. Cl.
| | |
|---|---|
| *G05D 1/02* | (2006.01) |
| *B60W 30/16* | (2012.01) |
| *B60W 10/18* | (2012.01) |
| *B60W 10/04* | (2006.01) |
| *B60W 10/20* | (2006.01) |

(52) U.S. Cl.
CPC .......... *G05D 1/0293* (2013.01); *B60W 10/04* (2013.01); *B60W 10/18* (2013.01); *B60W 10/20* (2013.01); *B60W 30/16* (2013.01)

(58) Field of Classification Search
CPC .... G05D 1/0293; B60W 10/04; B60W 10/18; B60W 30/16; B60W 10/20
USPC .......................................................... 701/96
See application file for complete search history.

(56) References Cited

U.S. PATENT DOCUMENTS

| | | | |
|---|---|---|---|
| 5,295,551 A | * 3/1994 | Sukonick | B62D 1/28 180/167 |
| 2016/0054735 A1 | * 2/2016 | Switkes | G08G 1/22 701/23 |

* cited by examiner

*Primary Examiner* — Brian P Sweeney

(57) ABSTRACT

A method for vehicle-to-vehicle communication is disclosed. The method includes establishing a communication connection between the first vehicle and the second vehicle, receiving one or more communications from the second vehicle, determining, by the first vehicle, vehicle parameter targets based on the one or more communications, communicating the vehicle parameter targets and one or more vehicle device commands to the second vehicle, and determining at least one vehicle control signal for the second vehicle based on the vehicle parameter targets and the one or more vehicle device commands.

6 Claims, 4 Drawing Sheets

METHODS AND SYSTEMS FOR VEHICLE-TO-VEHICLE COMMUNICATION

INTRODUCTION

The present invention relates generally to the field of vehicles and, more specifically, to vehicle-to-vehicle communications.

The operation of modern vehicles is becoming more automated, e.g. able to provide driving control with less and less driver intervention. Various automated driver-assistance systems, such as cruise control, adaptive cruise control, and parking assistance systems correspond to lower automation levels, while true "driverless" vehicles correspond to higher automation levels. Maintaining vehicle-to-vehicle communications is important for vehicles traveling in convoy, in order to avoid obstacles and maintain spacing between the vehicles. Communication between vehicles involved in a towing operation is valuable for many of the same reasons, especially if one or more of the vehicles is operating in an autonomous or semi-autonomous mode.

Additionally, current standards include the use of supplemental brakes on dinghy or towed vehicles to provide proportional braking based on the braking of the lead or towing vehicle or full braking independent of the lead vehicle. Supplemental braking systems are expensive aftermarket systems that increase the cost and complexity of towing operations, for example, recreational towing operations.

SUMMARY

Embodiments according to the present disclosure provide a number of advantages. For example, embodiments according to the present disclosure enable master-slave vehicle-to-vehicle communication for a four wheels down tow vehicle operation. A four wheels down tow vehicle operation includes recreational vehicle towing. The master-slave communication protocol automatically synchronizes communication between the master or towing vehicle and the slave or towed vehicle and configures the towed vehicle for tow operation. This allows the towing or lead vehicle to monitor and direct actuation of the towed vehicle's systems, subsystems, and components during towing, such as activation of the towed vehicle's factory-installed brakes, control actuators, and sensors, among other components, eliminating, for example, the installation of expensive aftermarket supplemental braking systems. By utilizing the communication and assisted driving systems present in the towed and towing vehicles, the master-slave communication protocol allows vehicles to be towed easily, conveniently, and economically.

In one aspect, a method for vehicle-to-vehicle communication is disclosed. The method includes the steps of providing a first vehicle with a first communication system and a first controller in communication with the first communication system; providing a second vehicle with a second communication system and a second controller in communication with the second communication system; establishing a communication connection between the first vehicle and the second vehicle; receiving, by the first controller, one or more communications from the second vehicle; determining, by the first controller, vehicle parameter targets based on the one or more communications; communicating, by the first communication system, the vehicle parameter targets to the second vehicle; communicating, by the first communication system, one or more vehicle device commands to the second vehicle, wherein the one or more vehicle device commands include one or more of a lighting command, a door locking command, and a window operation command; receiving, by the second communication system, the vehicle parameter targets and the one or more vehicle device commands; and determining, by the second controller, at least one vehicle control signal based on the vehicle parameter targets.

In some aspects, the connection is a wireless serial data communication link. In some aspects, the one or more communications include status information corresponding to a vehicle health status of the second vehicle. In some aspects, the status information includes data corresponding to one or more of a successful serial data link and status data of the second vehicle. In some aspects, the status data includes one or more of a throttle status, a brake status, a steering status, a transmission status, an engine status, a fuel level, and a battery charge. In some aspects, the vehicle parameter targets include one or more of a vehicle speed target, a vehicle velocity target, an acceleration target, a deceleration target, a steering target, an anti-sway parameter target, and a bounce mitigation target. In some aspects, the lighting command includes one or more of a brake light illumination command, an emergency flasher illumination command, a backup light illumination command, and a parking light illumination command. In some aspects, the vehicle control signal includes one or more of a steering command, a braking command, a throttle command, and a shifting command. In some aspects, the method further includes the step of automatically controlling, by the second controller, one or more of vehicle steering, braking, throttle, or shifting of the second vehicle based on the vehicle control signal.

In another aspect, a system for vehicle-to-vehicle communication between a first vehicle and a second vehicle traveling in a convoy includes a first communication system and a first controller located in the first vehicle, the first controller in communication with the first communication system, the first controller configured to establish a connection between the first vehicle and the second vehicle; receive one or more communications corresponding to a status of the second vehicle; determine vehicle operation parameter targets and device operation instructions based on the one or more communications; and transmit the vehicle operation parameter targets and device operation instructions to the second vehicle; and a second communication system, an actuator, and a second controller located in the second vehicle, the second controller in communication with the second communication system and the actuator, the second controller configured to monitor one or more vehicle parameters of the second vehicle; monitor one or more devices of the second vehicle; transmit status information of the second vehicle to the first vehicle; receive the vehicle operation parameter targets from the first controller; determine an actuator control signal based on the vehicle operation parameter targets; automatically control one or more of vehicle steering, vehicle braking, and vehicle throttle levels of the second vehicle based on the actuator control signal; and automatically control one or more devices of the second vehicle based on the device operation instructions received from the first controller.

In some aspects, the second controller is further configured to detect and track obstacles in a predetermined vicinity of the second vehicle. In some aspects, the one or more devices of the second vehicle include one or more of brake lights, turn signals, emergency flashers, parking lights, power door locks, power windows, and a trunk lid. In some aspects, the status information includes a tow bar connection status, a serial communication connection status, a strength of the serial communication connection, a fuel level of the second vehicle, a battery charge of the second vehicle, a tire pressure of the second vehicle, an engine speed of the second vehicle, a door lock status, a window level status, a trunk lid status, and an accessory status. In some aspects, obstacle detection and tracking includes parking assist/virtual bumper monitoring, side blind zone monitoring, and rear cross traffic monitoring.

In yet another aspect, a method of controlling a vehicle in a convoy of vehicles includes the steps of providing a first vehicle with a first communication system and a first controller in communication with the first communication system; providing a second vehicle with a second communication system, an actuator configured to control vehicle steering, throttle, braking, or shifting, and a second controller in communication with the second communication system and the actuator; establishing a communication connection between the first vehicle and the second vehicle; receiving, by the first controller, one or more communications from the second vehicle; determining, by the first controller, vehicle parameter targets based on the one or more communications; communicating, by the first communication system, the vehicle parameter targets to the second vehicle; receiving, by the second communication system, the vehicle parameter targets; determining, by the second controller, at least one vehicle control signal based on the vehicle parameter targets; and automatically controlling, by the second controller, the actuator according to the at least one vehicle control signal.

In some aspects, the one or more communications include status information corresponding to a vehicle health status of the second vehicle. In some aspects, the status information includes data corresponding to one or more of a successful serial data link and status data of the second vehicle. In some aspects, the status data includes one or more of a throttle status, a brake status, a steering status, a transmission status, an engine status, a fuel level, and a battery charge. In some aspects, the vehicle parameter targets include one or more of a vehicle speed target, a vehicle velocity target, an acceleration target, a deceleration target, a steering target, an anti-sway parameter target, and a bounce mitigation target. In some aspects, the at least one vehicle control signal includes one or more of a steering command, a braking command, a throttle command, and a shifting command.

BRIEF DESCRIPTION OF THE DRAWINGS

The present disclosure will be described in conjunction with the following figures, wherein like numerals denote like elements.

Figure 1:
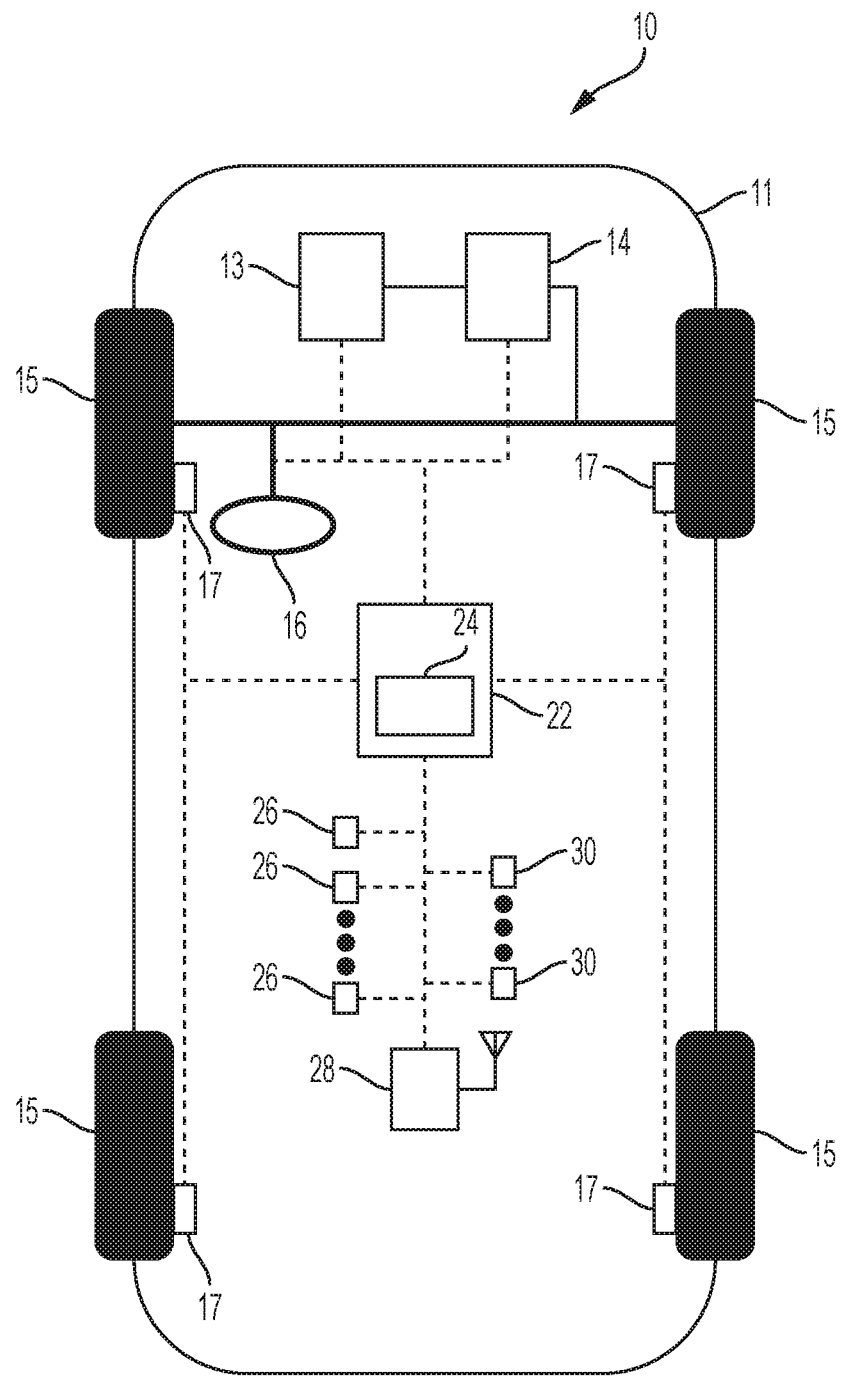
FIG. 1 is a schematic diagram of a vehicle that may be either a master or a slave vehicle or both, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left" "right" "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout this disclosure, the terms first, master, lead or towing are used interchangeably to refer to the vehicle performing the towing operation and the terms second, slave, follower, dinghy, or towed are used interchangeably to refer to the vehicle or vehicles being towed.

Vehicle towing operations typically use a physical electrical connection between the towing and the towed vehicle for operation of lights and brakes on the towed vehicle, in addition to the physical towing connection. The electrical connection, in the form of an electrical harness, allows for brake and lighting control instructions to pass between the towing vehicle and the towed vehicle. The physical electrical harness increases the complexity and inconvenience of the towing arrangement. Additionally, vehicle towing operations also typically involve installing a supplemental braking system on the towed vehicle to provide proportional braking based on the braking of the towing vehicle or full braking independent of the towing vehicle. A communication protocol between the towing vehicle and the towed vehicle, as discussed below, provides several advantages over a physical electrical connection and eliminates the supplemental braking system. In some embodiments, the towing vehicle can transmit vehicle control commands to the towed vehicle to control various vehicle operations, such as throttle, brake, steering, lights, etc. based on the detected environment and planned vehicle route and using factory-installed components of the towed vehicle. Additionally, the towing vehicle can receive status updates on the towed vehicle systems, subsystems, and components, such as fuel level, battery charge, engine speed, tire pressure, etc. that can be factored in to the vehicle operation commands sent to the towed vehicle.

FIG. 1 schematically illustrates an automotive vehicle 10. The vehicle 10 may be either a master, lead, or towing vehicle or a slave, follower, or towed vehicle, as discussed in greater detail below. The vehicle 10, shown schematically in FIG. 1, includes a propulsion system 13, which may in various embodiments include an internal combustion engine, an electric machine such as a traction motor, and/or a fuel cell propulsion system. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 10 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 10 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 10 additionally includes a steering system 16. While depicted as including a steering wheel for illustrative purposes, in some embodiments contemplated within the scope of the present disclosure, the steering system 16 may not include a steering wheel.

The vehicle 10 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards, using Bluetooth, or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and braking system including wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

In some embodiments, the controller 22 includes an automated driving assistance system (ADAS) 24 for automatically controlling various actuators in the vehicle 10. In an exemplary embodiment, the ADAS 24 is configured to control the propulsion system 13, transmission 14, steering system 16, and wheel brakes 17 to control vehicle acceleration, steering, shifting, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

Figure 2:
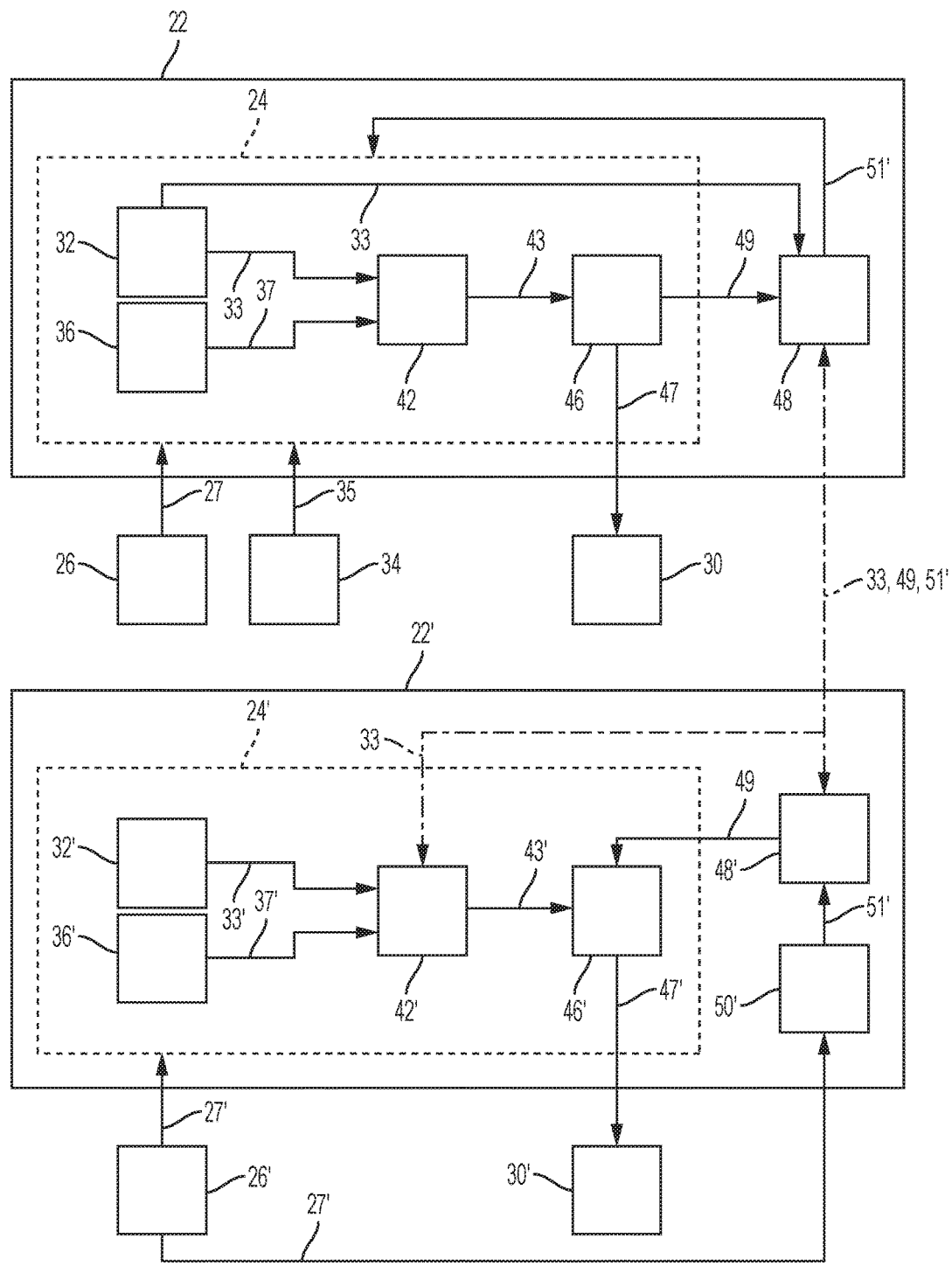
FIG. 2 is a schematic block diagram of a controller for a master vehicle and a controller for a slave vehicle, according to an embodiment.

FIG. 2 illustrates a controller 22 of a master vehicle, such as the vehicle 10, and a controller 22' of a slave vehicle, such as the vehicle 10. Information is passed between the two controllers 22, 22' via the communication systems 28 of the master and slave vehicles 10, as discussed in greater detail below. In FIG. 2, like numbers refer to like components or modules. As shown in FIG. 2, the ADAS 24 of the master vehicle includes multiple distinct control systems, including a sensor fusion and preprocessing module 32 that processes and synthesizes sensor data 27 from the variety of sensors 26 and human-machine interface (HMI) data 35 from an HMI device 34. The sensor fusion and preprocessing module 32 performs calibration of the sensor data 27. The HMI data 35 includes data from one or more HMI devices of the master vehicle, including, for example and without limitation, a user-operated indicator (e.g., button, toggle, switch, knob, etc.) that indicates an initiation of tow operation Initiation of a tow operation establishes a serial communication and cybersecurity link with the slave vehicle. The sensor fusion and preprocessing module 32 outputs preprocessed sensor output 33. The sensor output 33 includes various calculated parameters including, but not limited to, a location of a detected obstacle relative to the vehicle, a predicted path of the detected obstacle relative to the vehicle, a location and orientation of traffic lanes relative to the vehicle, and a tow operation and communication link status.

The ADAS 24 also includes a mapping and localization module 36 for determining the location of the vehicle and route for a current drive cycle. The mapping and localization module 36 is also configured to receive inputs from a variety of sensors, such as the sensors 26 illustrated in FIG. 1. The mapping and localization module 36 processes and synthesizes the inputs from the variety of sensors, and generates a mapping and localization output 37. The mapping and localization output 37 includes various calculated parameters including, but not limited to, a vehicle route for the current drive cycle, and a current vehicle location relative to the route.

The ADAS 24 additionally includes a path planning module 42 for determining a vehicle path to be followed to maintain the vehicle on the desired route while obeying traffic laws and avoiding any detected obstacles. The path planning module 42 employs a first obstacle avoidance algorithm configured to avoid any detected obstacles in the vicinity of the vehicle, a first lane keeping algorithm configured to maintain the vehicle in a current traffic lane, and a first route keeping algorithm configured to maintain the vehicle on the desired route. The path planning module 42 is configured to receive the sensor output 33 and the mapping and localization output 37. The path planning module 42 processes and synthesizes the sensor output 33 and the mapping and localization output 37 and generates a path planning output 43. The path planning output 43 includes a commanded vehicle path based on the vehicle route, vehicle location relative to the route, location and orientation of traffic lanes, and the presence and path of any detected obstacles.

The ADAS 24 further includes a vehicle control module 46 for issuing control commands to vehicle actuators 30. The vehicle control module 46 employs a path algorithm for calculating a vehicle path and a control algorithm for calculating a master vehicle control signal and a slave vehicle control signal. The vehicle control module 46 is configured to receive the path planning output 43 and slave vehicle information output 51'. The slave vehicle information output 51' includes, for example and without limitation, data regarding the health and status of the slave vehicle. The vehicle control module 46 processes the path planning output 43 and the slave vehicle information output 51' and generates a vehicle control output 47 and a master-to-slave vehicle control output 49. The vehicle control output 47 includes a set of actuator commands to achieve the commanded path from the vehicle control module 46 for the master vehicle, including but not limited to a steering command, a shift command, a throttle command, and a brake command. The master-to-slave vehicle control output 49 includes a set of actuator commands to achieve the commanded tow vehicle path including but not limited to a steering command, a shift command, a throttle command, a brake command, and anti-sway and anti-bounce mitigation commands for the slave or towed vehicle. The master-to-slave vehicle control output 49 also includes commands to control factory-installed slave vehicle devices including, but not limited to, brake lights, turn signals, flasher lights, parking lamps, other lights, parking brake, door locks, window up/down/lock positions, and trunk lid open/close status.

The vehicle control output 47 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

The controller 22 of the master vehicle also includes a communication module 48. Similarly, the controller 22' of the slave vehicle includes a communication module 48'. In some embodiments, the communication modules 48, 48' act as gateways for wireless or wired communications between the master or towing vehicle and the slave or towed vehicle. The communications modules 48 is configured to receive the slave vehicle information output 51' from the slave vehicle and transmit the slave vehicle information output 51' to the ADAS 24. The various modules of the ADAS 24 are configured to receive the slave vehicle information output 51' to generate the vehicle control output 47 and the master-to-slave vehicle control output 49. In some embodiments, the sensor fusion and preprocessing module 32 is configured to receive the slave vehicle information output 51' to generate the preprocessed sensor output 33. In some embodiments, as discussed above, the vehicle control module 46 is configured to directly receive the slave vehicle information output 51' to generate the vehicle control output 47 and the master-to-slave vehicle control output 49.

The communication module 48 is also configured to receive and transmit the preprocessed sensor output 33 from the master vehicle to the slave vehicle. The preprocessed sensor data includes parametric lead vehicle data including vehicle speed and velocity, acceleration and deceleration rates, stability data, traction data, etc. The preprocessed sensors data 33 is used by the follower vehicle to determine control strategies for proportional braking using the factory-installed brakes, such as brakes 17, steering assist, anti-sway and bounce mitigation, etc. for the follower vehicle.

The master-to-slave vehicle control output 49 is communicated to the communication module 48 that is in communication with the communication module 48' of the slave vehicle. As discussed in greater detail below, the master-to-slave vehicle control output 49 is received by a vehicle control module 46' of the slave vehicle as one of the inputs used to generate a vehicle control output 47'.

Similar to the ADAS 24 of the master vehicle, ADAS 24' of the slave vehicle includes multiple distinct control systems, including a sensor fusion and preprocessing module 32' that processes and synthesizes sensor data 27' from the variety of sensors 26' of the slave vehicle 10. The sensor fusion and preprocessing module 32' performs calibration of the sensor data 27'. The sensor fusion and preprocessing module 32' outputs preprocessed sensor output 33'. The sensor output 33' includes various calculated parameters including, but not limited to, a location of a detected obstacle relative to the vehicle, a predicted path of the detected obstacle relative to the vehicle, and a location and orientation of traffic lanes relative to the vehicle.

The ADAS 24' also includes a mapping and localization module 36' for determining the location of the vehicle and route for a current drive cycle. The mapping and localization module 36' is also configured to receive inputs from a variety of sensors, such as the sensors 26 illustrated in FIG. 1. The mapping and localization module 36' processes and synthesizes the inputs from the variety of sensors, and generates a mapping and localization output 37'. The mapping and localization output 37' includes various calculated parameters including, but not limited to, a vehicle route for the current drive cycle, and a current vehicle location relative to the route.

The ADAS 24' additionally includes a path planning module 42' for determining a vehicle path to be followed to maintain the vehicle on the desired route while obeying traffic laws and avoiding any detected obstacles. The path planning module 42' employs a first obstacle avoidance algorithm configured to avoid any detected obstacles in the vicinity of the vehicle, a first lane keeping algorithm configured to maintain the vehicle in a current traffic lane, and a first route keeping algorithm configured to maintain the vehicle on the desired route. The path planning module 42' is configured to receive the sensor output 33' and the mapping and localization output 37'. The path planning module 42' also receives the preprocessed sensor output 33 from the master vehicle which is used as discussed above to determine braking, steering, anti-sway and bounce and other control strategies for the slave vehicle. The path planning module 42' processes and synthesizes the sensor output 33', the sensor output 33, and the mapping and localization output 37' and generates a path planning output 43'. The path planning output 43' includes a commanded vehicle path based on the vehicle route, vehicle location relative to the route, location and orientation of traffic lanes, and the presence and path of any detected obstacles.

The ADAS 24' further includes a vehicle control module 46' for issuing control commands to vehicle actuators 30'. The vehicle control module 46' employs a first path algorithm for calculating a vehicle path and a first control algorithm for calculating a slave vehicle control signal. The vehicle control module 46' is configured to receive the path planning output 43' and the master-to-slave vehicle control output 49. The vehicle control module 46' processes the path planning output 43' and the master-to-slave vehicle control output 49 and generates a vehicle control output 47'. The vehicle control output 47' includes a set of actuator commands to achieve the commanded path from the vehicle control module 46', including but not limited to a steering command, a shift command, a throttle command, and a brake command.

The vehicle control output 47' is communicated to actuators 30'. In an exemplary embodiment, the actuators 30' include a steering control, a shifter control, a throttle control, and a brake control of the slave vehicle. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

Additionally, as discussed above, the controller 22' of the slave vehicle includes the communication module 48'. The communication module 48', along with the communications system 28 of the slave vehicle, is configured to transmit to and receive information from the master vehicle. The controller 22' also includes a monitor module 50'. The monitor module 50' is configured to receive sensor data 27' from the sensors 26' of the slave vehicle and monitor a "state of health" of the towed or slave vehicle. The monitor module 50' processes and synthesizes the sensor data 27' and generates the slave vehicle information output 51'. The slave vehicle information output 51' includes information on the health and status of the slave vehicle, including, for example and without limitation, data on the tow bar connection between the towing and towed vehicle, a serial communication connection and strength of connection, fuel level, battery charge, tire pressure, engine speed, and miscellaneous faults and warnings related to operational conditions of the slave vehicle. In some embodiments, the slave vehicle information output 51' also includes device state status of various devices of the slave vehicle including, for example and without limitation, vehicle door locks (locked/unlocked), vehicle windows (up/down/locked/unlocked), trunk lid (open/closed), or other accessory status. Additionally, in some embodiments, the slave vehicle information output 51' includes information related to obstacle detection as determined by the various modules of the ADAS 24' including parking assist/virtual bumper information or monitoring, side blind zone alert information or monitoring, rear cross traffic alert information or monitoring, camera feeds, mechanical tow bar connection information, and slave vehicle stability information.

The communication module 48' is configured to receive the slave vehicle information output 51' and transmit the slave vehicle information output 51' to the master vehicle via the communications system 38 and communication module 48 of the master vehicle using any type of wired or wireless communication method. For example, and without limitation, the communication interface options include any type of serial communication method including a hardwire data cable, Bluetooth wireless connection, or V2V DSRC wireless connection. Additionally, in some embodiments, infrared signaling is used to communication between the master and slave vehicles. In some embodiments, remote video, such as images captured by one or more cameras mounted on the slave vehicle, are transmitted to the master vehicle and displayed on a display screen, such as the screen of a built-in vehicle infotainment center, for review by the vehicle operator. In some embodiments, multiple embodiments of the above communication interface options are used for redundant communication between the master and slave vehicles.

Figure 3:
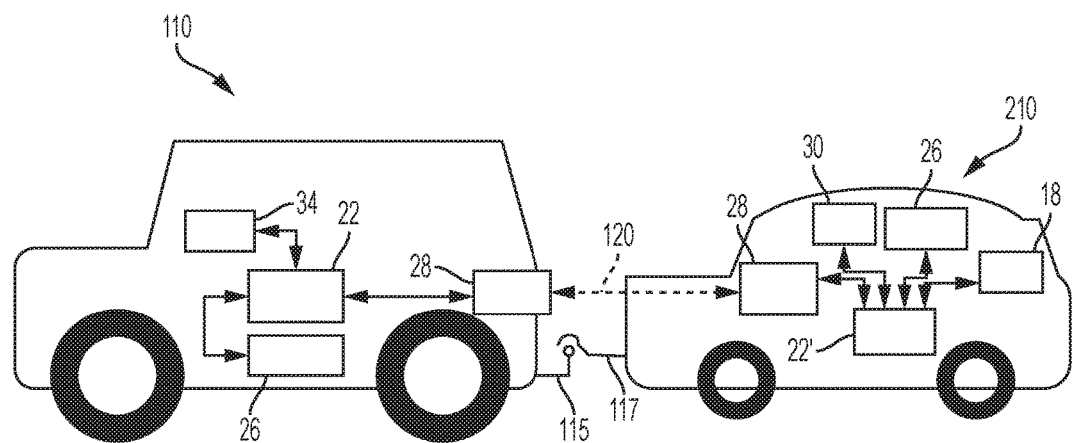
FIG. 3 is a schematic diagram of a tow operation including a master-slave vehicle-to-vehicle communication protocol, according to an embodiment.

FIG. 3 schematically illustrates a master-slave vehicle towing operation. The master vehicle 110 is an automotive vehicle, such as vehicle 10 shown in FIG. 1. The vehicle 110 may include all of the features of vehicle 10 shown in FIG. 1, or may contain more or less features. In some embodiments, the vehicle 110 may not include all of the modules of the ADAS 24 shown in FIG. 2. The vehicle 110 shown in FIG. 3 includes a controller 22 electrically connected to one or more sensors 26, the HMI device 34, and the communication system 28. The slave vehicle 210 is an automotive vehicle, such as vehicle 10 shown in FIG. 1. The vehicle 210 may include all of the features of vehicle 10 shown in FIG. 1, or may contain more or less features. The vehicle 210 shown in FIG. 3 includes a controller 22' electrically connected to one or more factory-installed sensors 26, one or more factory-installed actuators 30, one or more factory-installed vehicle devices 18 (e.g., brake lights, flashers, backup lights, parking lights, parking brake, door locks, windows, trunk lid, etc.), and the communication system 28, all of which are used for normal operation of the slave vehicle 210 when the slave vehicle 210 is not involved in a tow operation. The communication system 28 of the master vehicle 110 and the communication system 28 of the slave vehicle 210 are configured to communicate via communication link using a wired or wireless communication method, such as a hardwire data cable, Bluetooth wireless connection, or V2V DSRC wireless connection. The communication link enables the transfer and receipt of data between the master and the slave vehicles. The data can include control signals, image data, sensor data, etc. of one or both of the master vehicle 110 and the slave vehicle 210. In some embodiments, video images obtained by one or more of the sensors 26 of the slave vehicle 210 are transmitted to the master vehicle 110 via the communications systems 28 for review by the master vehicle operator. As discussed above, among the information transmitted between the master vehicle 110 and the slave vehicle 210 are the master-to-slave vehicle control output 49 and the slave vehicle information output 51'.

An operator of the master vehicle can initiate tow operation by manipulation of a user input device or HMI device 34, such as a button, knob, dial, etc. The initiation of the tow operation establishes a serial data connection 120 between the master and slave vehicles 110, 210. In some embodiments, the data connection 120 includes Cybersecurity protocols for additional protection. Cybersecurity protocols include preventing and detecting adversarial breaches and mitigating undesirable effects if a breach is achieved. The master vehicle 110 receives slave vehicle 210 status information via the data connection 120, including data corresponding to the status of the serial data connection 120, whether the tow vehicle is ready for tow as determined by processing of sensor data received from sensors 26 located on the slave vehicle 210, a state of health of the tow vehicle as determined by slave vehicle sensor data, slave vehicle device status and control including window, door, lights, and trunk lid status, and also any audible or visual alerts currently present on the slave vehicle 210.

Based on the status information received from the slave vehicle 210, the master vehicle 110 determines and sends, via the data connection 120, one or more control signals to the slave vehicle 210 to control slave vehicle operations including throttle, braking, steering, lighting, and device operation (windows, power door locks, etc.) using factory-installed components of the slave vehicle 210.

In some embodiments, the master vehicle 110 also sends, via the data connection 120, parametric data corresponding to operations of the master vehicle including, for example and without limitation, vehicle speed and velocity, acceleration and deceleration rates, stability data, traction data, etc. This data is used by the slave vehicle to determine slave vehicle control operations including throttle, braking, steering, etc.

In some embodiments, a CAN message structure is the primary model for the serial protocol of the communication link 120. The CAN message structure includes a standard address ID/message type (11 bit) plus eight data bytes (64 bits). In some embodiments, the data content of the messages transferred between the master and the slave vehicles is encrypted to reduce or prevent eavesdropping or spoofing. The encryption configuration may include entering the VIN of the towed or slave vehicle to generate secure, private keys. For messages that do not require all eight bytes of data, a full eight bytes is transmitted with the extra bytes padded with random-generated content to improve security.

Three of the main message types transmitted between the master and slave vehicles include distinct identification. These message types include commands/requests, command/request acknowledgements (that is, whether transmission was successful/accepted or not), and status information. Other message types are considered low bandwidth data. In some embodiments in which video data is transferred from the slave vehicle to the master vehicle, the live remote video feed (a high bandwidth data flow) is encoded in a large-packet streaming format rather than a CAN-based format.

In some embodiments, messages transmitted via Bluetooth or DSRC wireless messaging are transmitted with the address/message type padded to 16 bits such that the packet length is ten bytes plus the Bluetooth/DSRC message wrapper data. In some embodiments, messages transferred via infrared signaling use pulse code modulation (PCM) or frequency-shift keying (FSK) around a common carrier pulse frequency. Frequency-shift keying (FSK) is a frequency modulation scheme in which digital information is transmitted through discrete frequency changes of a carrier signal. In some embodiments, different district carrier pulse frequencies are used for Master out Slave in (MoSi) versus Master in Slave out (MiSo) data transmission directions. The frequency shift magnitude may be selected to minimize cross-talk between the coupled vehicle and between other road users. Configuration of these parameters may be done automatically at the time of towing operation authorization and initiation.

The slave vehicle 210 is mechanically coupled to the master vehicle 110 with a mechanical tow bar 117. The mechanical tow bar 117 is configured to attach to a towing system 115 coupled to the master vehicle 110. The towing system 115 includes any type of tow arrangement, including a receiver hitch, ball hitch, gooseneck hitch, etc.

Figure 4:
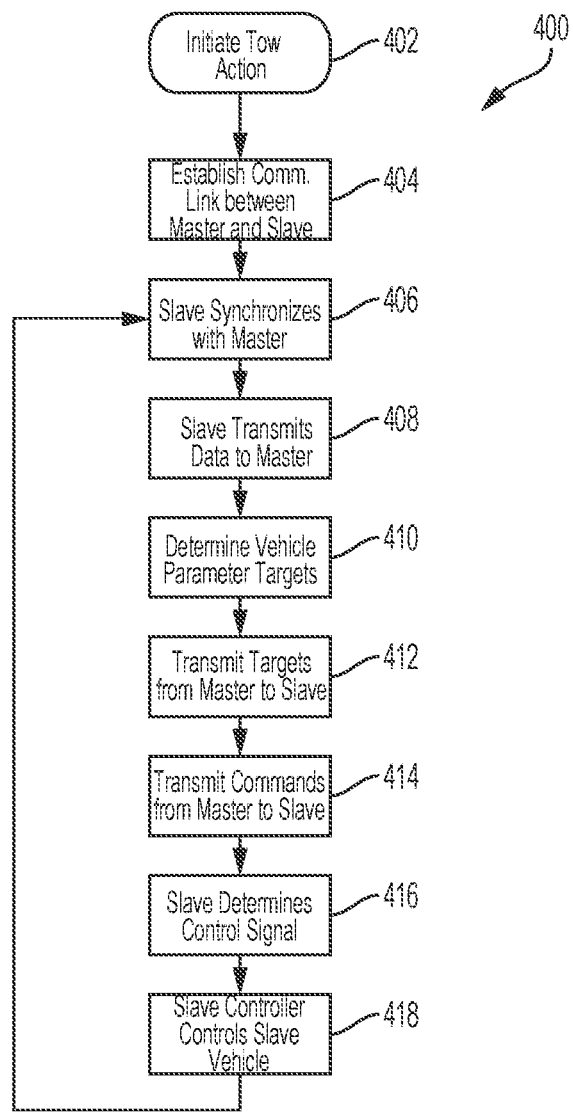
FIG. 4 is a flow chart of a method of master-slave vehicle-to-vehicle communication, according to an embodiment.

FIG. 4 is a flow chart of a method 400 illustrating master-slave vehicle-to-vehicle communication between two vehicles of a tow operation. The method discussed below may also be used for two vehicles traveling in a convoy. The method discussed below may also be used for more than two vehicles traveling in a convoy, such as a master vehicle and one or more slave vehicles. In some embodiments, the master vehicle communications with, receives data from, and sends control signals to one slave vehicle, two slave vehicles, or three slave vehicles traveling in a tow vehicle convoy with the master vehicle. The method 400 can be utilized in connection with master and slave vehicles, such as the vehicles 110, 210, the controllers 22, 22', and the various modules of the ADAS 24, 24', in accordance with exemplary embodiments. The order of operation of the method 400 is not limited to the sequential execution as illustrated in FIG. 4 but may be performed in one or more varying orders, or steps may be performed simultaneously, as applicable and in accordance with the present disclosure.

As shown in FIG. 4, starting at 402 with initiation of a tow operation, the method 400 proceeds to step 404. An operator of the master vehicle 110 can initiate a tow operation through manipulation of an HMI or device (e.g., a button, toggle, switch, etc.), such as HMI 34. At 404, the communication module 48 and the communication system 28 of the master vehicle 110 establish a communication link or connection with the communication system 28 and the communication module 48' of the slave vehicle 210. The communication link, such as the communication link 120 is, in some embodiments, a serial communication data link including cybersecurity protocols to protect the security of the data transmission. In some embodiments, the serial communication link is a Bluetooth wireless connection or a dedicated short-range communications (DSRC) channel. In some embodiments, the communication link is an infrared signaling link between the master and the slave vehicles, or is a remote video link. In some embodiments, more than one type of communication method may be used for redundancy.

Next, at 406, the slave vehicle 210 synchronizes with the master vehicle 110. Synchronizing with the master vehicle 110 indicates that the slave vehicle 210 is ready for towing. At 406, the monitor module 50' of the slave vehicle 210 monitors various operational parameters, such as the tow bar connection to the master vehicle 110, the serial communication data link connection and strength of the communication signal, a fuel level of the slave vehicle 210, a battery charge of the slave vehicle 210, a tire pressure of the slave vehicle 210, an engine speed of the slave vehicle 210, and any faults or warnings currently occurring on any of the slave vehicle systems, subsystems, or components. The monitor module 50' of the slave vehicle 210 also monitors the status of slave vehicle devices, such as devices 18, including the power door locks, power windows, trunk lid, and other accessories such as the radio, infotainment system, etc.

Next, at 408, the slave vehicle 210 transmits, via the communication module 48' and the communication system 28, one or more communications to the master vehicle 110. The communications include data regarding one or more of the various operational parameters discussed above or one or more of the device statuses discussed above. The communications are received by the communication module 48 and the communication system 28 of the master vehicle 110 and are processed by the controller 22. At 410, the various modules of the controller 22 determine vehicle operation parameter targets. The vehicle parameter targets are based on the communications received from the slave vehicle 210. The vehicle parameter targets include parametric data regarding vehicle speed and velocity, acceleration and deceleration rates, vehicle stability, vehicle traction, etc. The vehicle parameter targets may also include a vehicle path and the location and tracking of obstacles in the environment surrounding the vehicles 110, 210. Also at 410, the controller 22 of the master vehicle 110 determines device commands for one or more devices of the slave vehicle 210. The devices, such as devices 18 shown in FIG. 3, include brake lights, flashers, backup lights, and parking lights as well as the vehicle parking brake, door locks, windows, trunk lid, etc. The device commands include a lighting command for one or more of the vehicle lights (e.g., brake lights, flashers, backup lights, parking lights, etc.), a door locking command, and a window operation command.

At 412, the vehicle parameter targets are transmitted from the master vehicle 110 to the slave vehicle 210 via the communication link 120 established between the communication systems 28 of the vehicles 110, 210. Also at 412, the vehicle parameter targets are received by the communication system 28 of the slave vehicle 210. Next, at 414, the device commands are transmitted from the communication system 28 and the communication module 48 of the master vehicle 110 and are received by the communication system 28 and the communication module 48' of the slave vehicle 210.

At 416, the various modules of the controller 22' of the slave vehicle 210 determine at least one vehicle control signal based on the vehicle parameter targets received from the master vehicle 110. The at least one vehicle control signal is an actuator control signal that indicates the desired actuation of one or more of the braking, steering, throttle, or shifting systems of the vehicle 210. In some embodiments, the vehicle control signal directs proportional braking of the vehicle 210 using the factory-installed braking system of the vehicle 210, as well as manages the engine state (e.g., off or running) to provide electrical power and transmission lubrication, steering assistance (e.g., active maneuver assistance), and anti-sway and bounce mitigation. Next, at 418, the controller 22' automatically controls one or more of vehicle steering, braking, throttle, or shifting of the factory-installed steering, braking, throttle and shifting systems of the slave vehicle 210 based on the vehicle control signal. The method 400 then proceeds to 406 and continues as discussed above.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle in a convoy of vehicles, comprising:
   providing a first vehicle with a first communication system and a first controller in communication with the first communication system;
   providing a second vehicle with a second communication system, an actuator configured to control vehicle steering, throttle, braking, or shifting, and a second controller in communication with the second communication system and the actuator, the second vehicle physically connected to the first vehicle;
   establishing a communication connection between the first vehicle and the second vehicle;
   receiving, by the first controller, one or more communications from the second vehicle, wherein the one or more communications include status information corresponding to a vehicle health status of the second vehicle, and the vehicle health status includes a status of a physical connection between the first and second vehicles, a serial communication strength, a fuel level, a tire pressure, an engine speed, and one or more faults related to operational conditions of the second vehicle;
   determining, by the first controller, vehicle parameter targets for the first and second vehicles based on the one or more communications;
   communicating, by the first communication system, the vehicle parameter targets to the second vehicle;
   receiving, by the second communication system, the vehicle parameter targets;
   determining, by the second controller, at least one vehicle control signal based on the vehicle parameter targets; and
   automatically controlling, by the second controller, the actuator according to the at least one vehicle control signal.

2. The method of claim 1, wherein the status information comprises data corresponding to one or more of a successful serial data link and status data of the second vehicle.

3. The method of claim 2, wherein the status data comprises one or more of a throttle status, a brake status, a steering status, a transmission status, an engine status, a fuel level, and a battery charge.

4. The method of claim 3, wherein the vehicle parameter targets comprise one or more of a vehicle speed target, a vehicle velocity target, an acceleration target, a deceleration target, a steering target, an anti-sway parameter target, and a bounce mitigation target.

5. The method of claim 1, wherein the at least one vehicle control signal comprises one or more of a steering command, a braking command, a throttle command, and a shifting command.

6. The method of claim 1, further comprising communicating, by the first communication system, one or more vehicle device commands to the second vehicle, wherein the one or more vehicle device commands comprise one or more of a lighting command, a door locking command, and a window operation command.

* * * * *